United States Patent
Koerner

(10) Patent No.: US 8,647,236 B2
(45) Date of Patent: Feb. 11, 2014

(54) METHOD FOR SOUND MODELING FOR DOWNSHIFTING WITH INTERMEDIATE GAS

(75) Inventor: Marko Koerner, Leutenbach (DE)

(73) Assignee: Daimler AG, Stuttgart (DE)

( * ) Notice: Subject to any disclaimer, the term of this patent is extended or adjusted under 35 U.S.C. 154(b) by 508 days.

(21) Appl. No.: 12/988,435

(22) PCT Filed: Mar. 7, 2009

(86) PCT No.: PCT/EP2009/001646
§ 371 (c)(1),
(2), (4) Date: Jan. 10, 2011

(87) PCT Pub. No.: WO2009/127296
PCT Pub. Date: Oct. 22, 2009

(65) Prior Publication Data
US 2011/0105275 A1    May 5, 2011

(30) Foreign Application Priority Data
Apr. 16, 2008   (DE) .......................... 10 2008 018 969

(51) Int. Cl.
*B60W 10/04*    (2006.01)

(52) U.S. Cl.
USPC ...................................................... 477/109

(58) Field of Classification Search
USPC ................................................ 477/109, 101
See application file for complete search history.

(56) References Cited

U.S. PATENT DOCUMENTS

| | | | |
|---|---|---|---|
| 5,921,886 A * | 7/1999 | Takada et al. ................. | 477/110 |
| 6,154,701 A | 11/2000 | Loeffler et al. | |
| 6,597,978 B1 * | 7/2003 | Dreibholz et al. .............. | 701/51 |
| 7,347,805 B2 * | 3/2008 | Iriyama et al. ................. | 477/102 |
| 7,930,086 B2 | 4/2011 | Otsubo | |
| 2006/0037578 A1 * | 2/2006 | Nakamura .................... | 123/198 F |
| 2009/0133945 A1 * | 5/2009 | Falkenstein et al. ...... | 180/65.265 |

FOREIGN PATENT DOCUMENTS

| | | |
|---|---|---|
| DE | 197 31 728 A1 | 1/1998 |
| EP | 1 647 691 A2 | 4/2006 |
| JP | 7-17302 A | 1/1995 |
| JP | 9-142176 A | 6/1997 |
| JP | 10-89114 A | 4/1998 |
| JP | 2000-509676 A | 8/2000 |

(Continued)

OTHER PUBLICATIONS

International Search Report with partial English translation dated Oct. 6, 2009 and PCT/ISA/237 (Thirteen (13) pages).

(Continued)

*Primary Examiner* — David D Le
*Assistant Examiner* — David J Hlavka
(74) *Attorney, Agent, or Firm* — Crowell & Moring LLP

(57) ABSTRACT

In a method for controlling shifting in a motor vehicle having an internal combustion engine and an automatic transmission, intermediate gas is automatically applied for reducing and/or compensating for an abrupt shift when downshifting. In a first phase, wherein the transmission is in the hydraulic down time thereof, the actual torque provided by the engine is slowly increased, until a torque required by the transmission is achieved. Subsequently, in a second phase, wherein the actual torque of the engine is less than the target torque, a throttle valve is opened further. In a subsequent third phase, in which the actual torque of the engine has achieved the target torque required for synchronization, a late ignition angle is set.

7 Claims, 2 Drawing Sheets

(56) References Cited

FOREIGN PATENT DOCUMENTS

| | | |
|---|---|---|
| JP | 2003-112541 A | 4/2003 |
| JP | 2005-214346 A | 8/2005 |
| JP | 2006-112257 A | 4/2006 |
| JP | 2006-194172 A | 7/2006 |
| JP | 2007-32341 A | 2/2007 |
| WO | WO 02/078997 A1 | 10/2002 |
| WO | WO 2005/093238 A1 | 10/2005 |

OTHER PUBLICATIONS

Japanese-language Notification of Reason for Refusal dated Jan. 7, 2013 (two (2) pages).

* cited by examiner

METHOD FOR SOUND MODELING FOR DOWNSHIFTING WITH INTERMEDIATE GAS

This application is a national stage of PCT International Application No. PCT/EP2009/001646, filed Mar. 7, 2009, which claims priority under 35 U.S.C. §119 to German Patent Application No. DE 10 2008 018 969.3, filed Apr. 16, 2008, the entire disclosure of which is herein expressly incorporated by reference.

BACKGROUND AND SUMMARY OF THE INVENTION

The present invention relates to a method for controlling shifting actions of a motor vehicle having an internal combustion engine and an automatic transmission, wherein intermediate gas is automatically applied when downshifting.

With automatic transmissions, shifting pressures which occur during downshifting processes affect the driving comfort, the life span of the transmission and, in particular, with a very engaged method of driving with high transverse accelerations, the driving stability of the vehicle.

It is known in the state of the art to apply intermediate gas automatically for reducing and/or compensating the abrupt shift during a downshifting process. During this shifting process, the speed of the engine is increased to the speed that is required by the transmission after the downshifting process.

It is disadvantageous with the known methods for reducing or compensating the abrupt shift, that downshifting processes can only be perceived in an acoustically insufficient manner. This disadvantage can be observed particularly with very quiet engines.

One object of the invention, therefore is to provide an improved method for reducing or compensating an abrupt downshifting process. The improved method shall in particular depict downshifting processes in an acoustically clear manner.

This and other objects and advantages are achieved by the method according to the invention, in which intermediate gas is automatically applied for reducing or compensating for an abrupt downshift. In a first phase, in which the transmission is in its hydraulic down time, the actual torque provided by the engine is thereby slowly increased, until a torque required by the transmission is achieved. (This first phase is also called filling phase or slow start-up of the engine). Subsequently, a throttle valve is opened further in a second phase, in which the actual torque provided by the engine is still smaller than a target torque of the engine. (This second phase is also called first regulation phase and serves for the synchronization). This second phase aims for a build-up of the actual torque delivered by the engine as fast as possible in the interest of a fast shifting process; that is, the target torque of the engine is especially large (preferably at its maximum). In order to enable a build-up of the torque as fast as possible, a torque reserve is required during the second phase, which is also called reserve parameter.

According to the invention, a late ignition time is subsequently set in a third phase, which serves for the synchronization as the second phase and in which the actual torque of the engine achieves the target torque required for the synchronization. This means that the ignition angle is substantially retarded. In particular in the third phase, the ignition time is set at least intermittently later than with a crankshaft angle of +5° before the top of dead center, and in a particularly preferred embodiment, its ignition time is set after the top of dead center (for example, with a crankshaft angle of)−10°. By this strong displacement of the ignition angle, that is, the ignition time in the retarded direction, an acoustically clearly perceivable sound, in particular a very sporty sound, is generated by the engine. In order to generate this sporty sound, an additional torque reserve is required, whereby the displacement of the ignition angle, that is, the ignition time in the retarded direction, is achieved. It is also possible to blank the injection for one or several cylinders in the third phase.

Sporty characteristics of the vehicle can be emphasized acoustically by the method according to the invention. The acoustically clearly perceivable sound, in particular a very sporty sound, can thereby be differentiated in a simple manner for different driving programs of a vehicle or for different vehicle classes.

In one embodiment of the invention, one or more cylinders of the engine are blanked in a fourth phase. (That is, the ignition and/or injection of fuel are switched off completely.) In the fourth phase, (also called the trailing phase), the engine speed is synchronized, and the engine must be brought either to a torque given by the driver of the vehicle, (driver parameter torque), or to the throttle cutoff as quickly as possible. The setting of the torque of the engine as quickly as possible preferably takes place via an ignition path.

By the blanking of one or several cylinders, a sound that can be clearly perceived can be generated, in particular a very sporty sound. By means of the blanking of one or several cylinders, a reduction of the torque of the engine increased by the automatic intermediate gas to the speed required for the synchronization can in particular take place. It is thus possible to correct an additional measure of the intermediate gas which only took place for sound generation, to the measure necessary for synchronization. By switching off the ignition, it is additionally possible to generate defined explosions of a fuel air mixture in the exhaust with sufficiently high temperatures, and thereby to improve further the acoustic perceptibility of the sound during the intermediate gas.

In a further embodiment of the invention, the engine is operated in the first phase with an adjustable minimum torque, if the torque required by the transmission is smaller than the minimum torque.

Another arrangement of the method according to the invention provides that a late ignition time is set in the third phase and/or one or several cylinders of the engine are blanked in the fourth phase, only if no reserve requirement is present from the automatic transmission, a direct transmission access is present, and a required transmission torque is larger than the desired torque predefined by the driver.

With the method according to the invention, the speed of the engine required for the synchronization is automatically calculated from a measured wheel speed and a predefined target transmission.

The blanking of one or more cylinders also takes place automatically in dependence on the speed and gear when approaching the speed of the engine to the desired synchronization speed. A "bubbling" is thereby generated at the end of the shift process.

With the method according to the invention, a maximum torque reserve of the engine is calculated which is weighted with predefinable characteristic fields. The height of the torque reserve of the engine, or the position of the ignition angle (that is, the ignition time), is defined via these weightings.

Other objects, advantages and novel features of the present invention will become apparent from the following detailed description of the invention when considered in conjunction with the accompanying drawings.

DETAILED DESCRIPTION OF THE DRAWINGS

Figure 1:
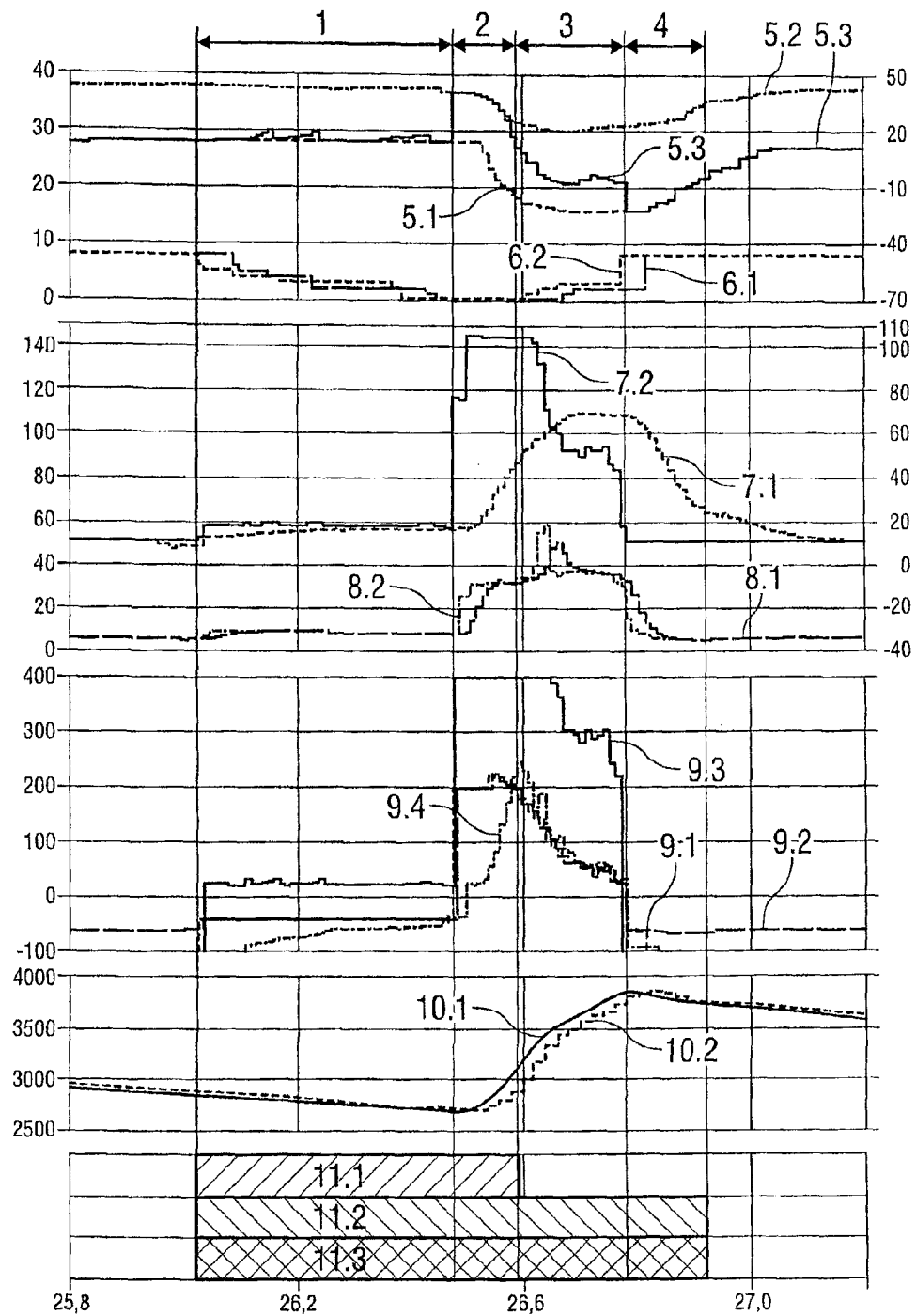
FIG. 1 is a first diagram of an intermediate gas function.

FIG. 1 shows the temporal course of a downshifting process with automatic intermediate gas in an exemplary manner, wherein different parameters are shown for the time span between 25.8 s and 27.2 s. From top to bottom is shown the temporal course of a late ignition angle 5.1, a basic ignition angle 5.2 and an actual ignition angle 5.3; the temporal course of an actual reduction step 6.1 and of a target reduction step 6.2; the temporal course of engine load 7.1 and of a target load 7.2 of the engine; the temporal course of a valve angle 8.1 and of a target valve angle 8.2 of a throttle valve; the temporal course of a transmission torque 9.1, of an engine target torque 9.2 of a reserve target torque 9.3 and of an actual engine torque 9.4; and the temporal course of an engine speed 10.1 and of a turbine speed 10.2. The time spans, in which a reserve parameter 11.1, a minimal access 11.2 and a maximal access 11.3 are required, are shown as shaded.

In a first phase 1, in which the transmission is in its hydraulic down time, the actual engine torque provided by the engine is increased slowly, until the transmission torque 9.1 required by the transmission is achieved. The target valve angle 8.2 and the actual valve angle 8.1 of the throttle valve are thereby smaller than 10%. The actual ignition angle 5.3 typically proceeds between about +10° and +20° crankshaft angle, thus as usual clearly before the top of dead center. The engine speed 10.1 and the turbine speed 10.2 reduce slowly and continuously.

In a second phase (which serves for the synchronization), the actual engine torque 9.4 supplied by the engine is still smaller than the target engine torque 9.2, whose value is the same as the transmission torque 9.1. The throttle valve is opened further in the second phase 2. In this second phase 2, a build-up of the actual engine torque 9.4 as quick as possible is aimed for achieving a quick shift process, so that the target engine torque 9.2 is particularly high. The actual engine torque 9.4 increases continuously until the target engine torque 9.2 is achieved. In the second phase 2, the required target reserve torque 9.3 is particularly high compared to the first phase 1.

In a third phase 3, which serves for synchronization as the second phase, and in which the actual engine torque 9.4 achieves the target engine torque 9.2 required for the synchronization, a very late actual ignition angle 5.3 is set, the actual ignition angle 5.3 is thus further displaced in the retarded direction even with relation to the first phase 1, in which the ignition time is already set relatively late. At the end of the third phase 3, the actual ignition 5.3 is set to −20° crankshaft angle in the shown embodiment. By this large displacement of the ignition angle in the retarded direction, an acoustically clearly perceivable sound, a changed exhaust sound, which is subjectively perceived as a very sporty sound, is generated by the engine. For this, an additional reserve target torque 9.3 is required, whose value is typically between over 400 Nm and over 200 Nm during the course of the third phase 3.

Figure 2:
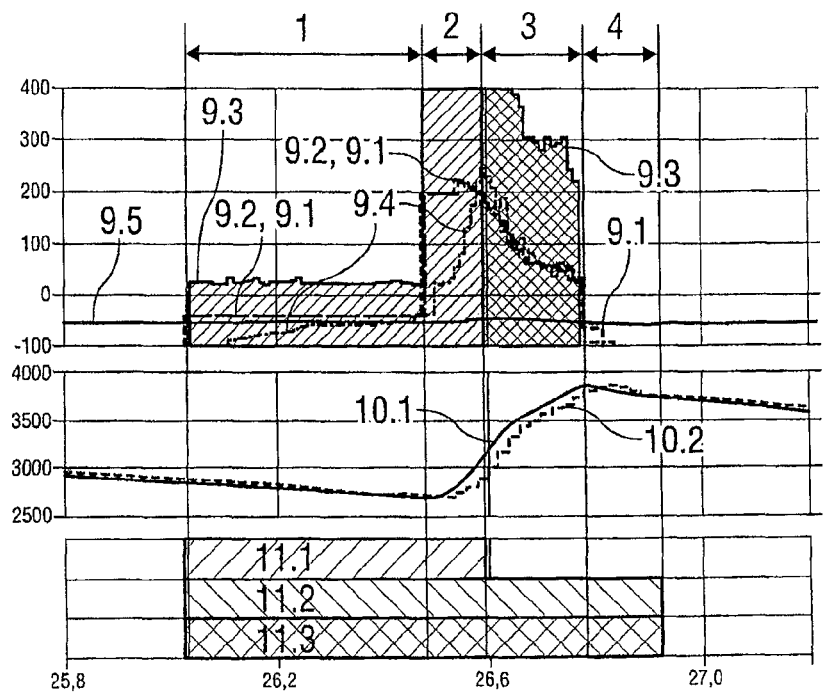
FIG. 2 is an associated second diagram of this intermediate gas function with a sound function.

FIG. 2 shows an example of the temporal course of a downshifting process with automatic intermediate gas for the time span between 25.8 s and 27.3 s depicted in FIG. 1, wherein the temporal course of the transmission torque 9.1, the target engine torque 9.2, the reserve target source 9.3, the actual engine torque 9.4 and a driver parameter torque 9.5, as well as the temporal course of the engine speed 10.1 and the turbine speed 10.2, are depicted with intermediate gas with a so-called sound function.

The shown courses of torques 9.1 to 9.2 and speeds 10.1 and 10.2 correspond to the courses depicted in FIG. 1, in particular regarding the displacement of the actual ignition angle 5.3 in the retarded direction and regarding the course of the additionally required reserve target torque 9.3. For the first phase 1 and for the second phase 2, the surface below the course of the reserve target torque is depicted in a simple shaded manner. For the third phase 3, the surface below the course of the reserve target torque 9.3 is shown in a shaded cross-shaped manner. This region shaded in a cross-shaped manner depicts a torque reserve from the sound function.

Figure 3:
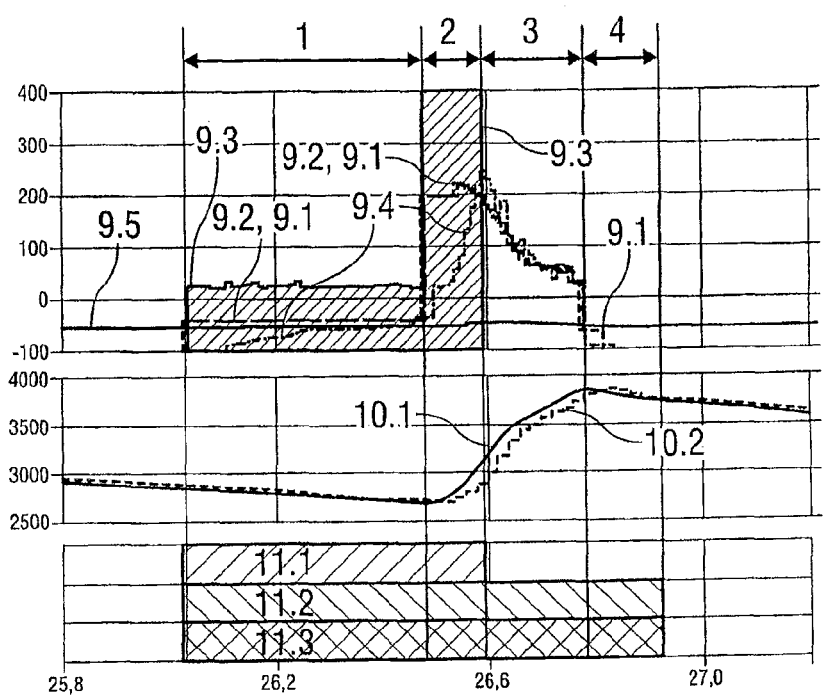
FIG. 3 is an associated second diagram of this intermediate gas function without a sound function.

FIG. 3 shows an example of the temporal course of a downshifting process without the sound function depicted in FIG. 2. The illustrated courses show a method without the displacement of the actual ignition angle 5.3 according to the invention into the direction late in the third phase 3, and without the course according to the invention of an additionally required reserve target torque 9.3 in the third phase 3. That is, FIG. 3 shows the course for an automatic intermediate gas without the sound effected according to the invention that can be clearly perceived acoustically, which is subjectively perceived as a changed exhaust sound as a very sporty sound (also called sound function). The surface below the course of the reserve target torque 9.3 is also simply shown in a shaded manner for the first phase 1 and for the second phase 2. The reserve target torque 9.3 is zero for the third phase 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims.

LIST OF REFERENCE NUMERALS 1 first phase
2 second phase
3 third phase
4 fourth phase
5.1 Late ignition angle
5.2 Basic ignition angle
5.3 Actual ignition angle
6.1 Actual reduction step
6.2 Target reduction step
7.1 Engine load
7.2 Target load
8.1 Valve angle
8.2 Target valve angle
9.1 Transmission torque
9.2 Target engine torque
9.3 Reserve target torque
9.4 Actual engine torque
9.5 Driver parameter torque
10.1 Engine speed
10.2 Turbine speed
11.1 Reserve allowance
11.2 Min. access
11.3 Max. access

The invention claimed is:

1. A method for controlling shifting in a motor vehicle having an internal combustion engine and an automatic transmission, wherein:
   intermediate gas is automatically applied for reducing or compensating for an abrupt shift when downshifting;
   in a first phase, in which the transmission is in a hydraulic down time, actual engine torque provided by the engine is slowly increased, until a transmission torque required by the transmission is achieved, wherein the actual engine torque is less than a target engine torque during the first phase;
   subsequently, in a second phase, in which the actual engine torque is less than a the target engine torque, an open throttle valve is opened further;
   in a subsequent third phase, in which the actual engine torque has achieved the engine target torque required for synchronization, an actual ignition angle is retarded; and
   in a subsequent fourth phase, at least one cylinder of the engine is blanked.

2. The method according to claim 1, wherein the set actual ignition angle is at least temporally later than +5°.

3. The method according to claim 1, wherein the set actual ignition angle is at least temporally later than −10°.

4. A method for controlling shifting in a motor vehicle having an internal combustion engine and an automatic transmission, wherein:
   intermediate gas is automatically applied for reducing or compensating for an abrupt shift when downshifting;
   in a first phase, in which the transmission is in a hydraulic down time, actual engine torque provided by the engine is slowly increased, until a transmission torque required by the transmission is achieved;
   subsequently, in a second phase, in which the actual engine torque is less than a target engine torque, an open throttle valve is opened further;
   in a subsequent third phase, in which the actual engine torque has achieved the engine target torque required for synchronization, an actual ignition angle is retarded; and
   wherein at least one cylinder of the engine is blanked in a fourth phase, wherein the engine is operated with an adjustable minimum torque in a first phase, if the transmission torque required by the transmission is smaller than a minimum torque.

5. The method according to claim 4, wherein a late ignition angle is set in the third phase or at least one cylinder of the engine is blanked in the fourth phase only if i) a reserve requirement is not present from the automatic transmission, ii) a direct transmission access is present, and iii) a required transmission torque is higher than a driver parameter torque given by the driver of the vehicle.

6. The method according to claim 4, wherein the set actual ignition angle is at least temporally later than +5°.

7. The method according to claim 4, wherein the set actual ignition angle is at least temporally later than −10°.

* * * * *